Dec. 9, 1947.   J. W. BOWLES   2,432,375
SAFETY LANDING EQUIPMENT FOR AEROPLANES
Filed Sept. 7, 1944   2 Sheets-Sheet 1

INVENTOR.
John W. Bowles
BY
Carl Miller
ATTORNEY

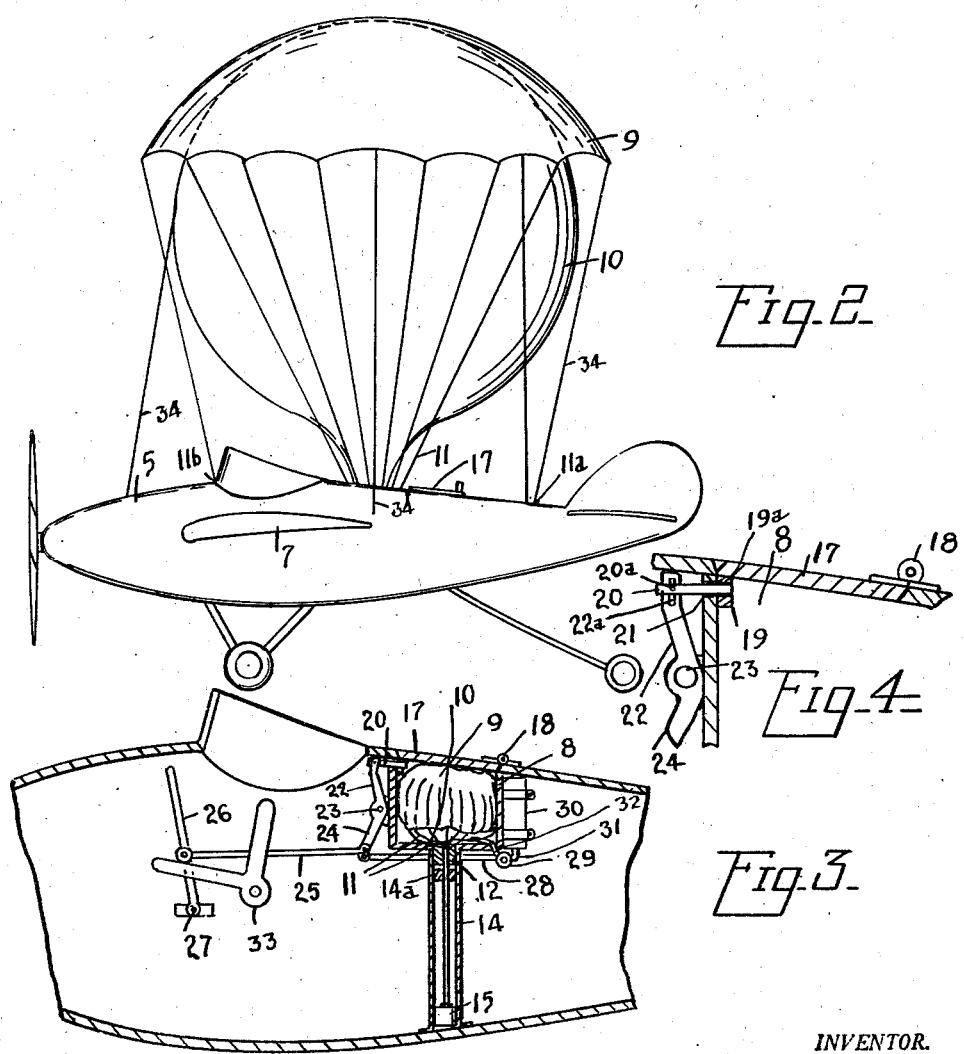

Patented Dec. 9, 1947

2,432,375

UNITED STATES PATENT OFFICE 2,432,375

SAFETY LANDING EQUIPMENT FOR AEROPLANES

John William Bowles, Meadow Creek, W. Va., assignor of sixty-six and two-thirds per cent to L. L. Bowles, J. W. Halstead, Thayer, and Ben D. Bowles, Meadow Creek, W. Va.

Application September 7, 1944, Serial No. 552,960

1 Claim. (Cl. 244—139)

This invention relates to improvements in safety landing equipment for aeroplanes, and one of its objects is to provide a quickly released parachute for preventing a quick crash descent of an aeroplane, and to also provide a quickly inflatable balloon for opening the parachute, so that there will be no lag in time between the time when a critical danger appears and the time when the parachute is fully expanded and in a position to delay the descent of the aeroplane.

A further object of the invention is to provide a chamber for holding both the parachute and the balloon in their normal collapsed condition, and means for releasing both the parachute and balloon and at the same time supplying the balloon with a buoyant or expansion gas.

With the above and other objects in view the invention consists in certain new and useful combinations, arrangements of parts and certain constructions, clearly described in the following specification, and fully illustrated in the drawings, in which—

Fig. 2 is a side elevation thereof.

Fig. 3 is a detail longitudinal sectional view through the body of the aeroplane, showing the chamber in which the collapsed parachute and balloon are stored, and also showing the means for releasing both the parachute and the balloon and for supplying an expansive gas to the latter.

Fig. 4 is a detail sectional view showing the means for releasing the door for the holding chamber in which the parachute and balloon are stored.

Figure 1:
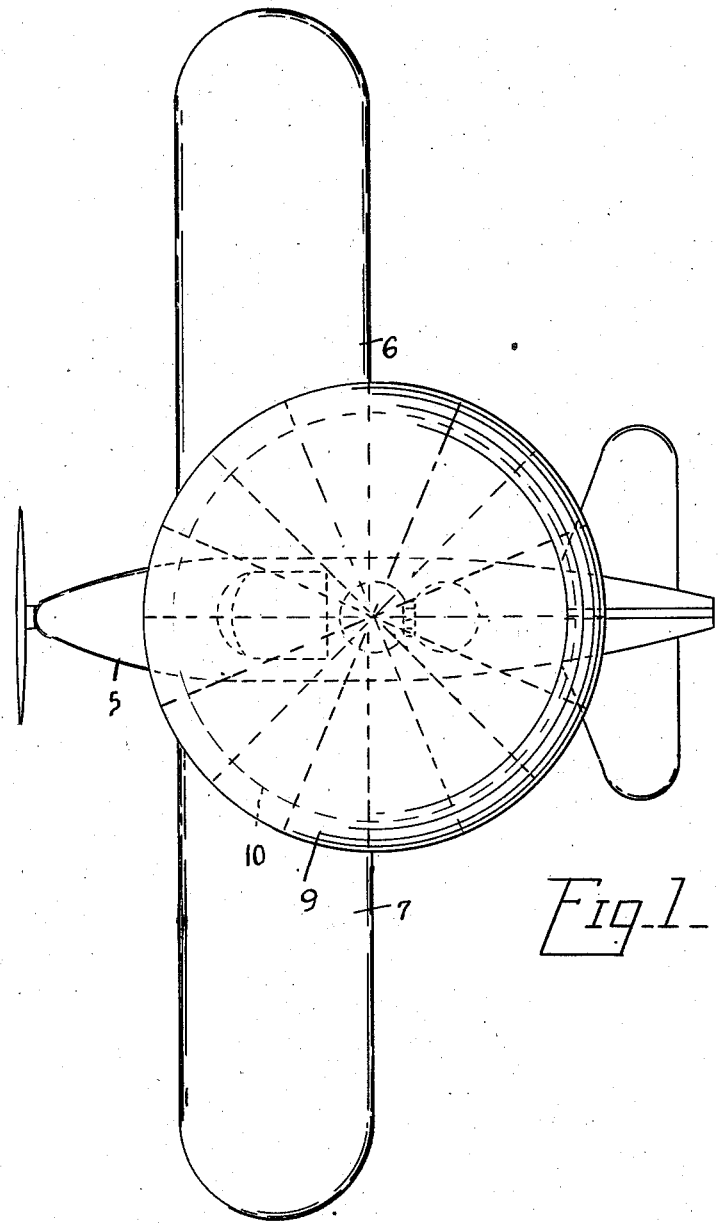
Fig. 1 is a top plan view, showing the parachute fully expanded above an aeroplane, the balloon being indicated in dotted lines.

Referring to the accompanying drawings, which illustrate the practical construction of the invention 5 designates the body or fuselage of an aeroplane, which is provided with the usual supporting wings 6 and 7.

The body of the aeroplane is also provided with a box-like chamber 8 in which the normally collapsed parachute 9 and the balloon 10 are arranged, the latter within the former. This chamber is located so that the parachute will be approximately attached centrally of the aeroplane. The restraining cords 11 of the parachute are partly connected to the body 5 at the points indicated at 11a, 11b and 11c, and partly to the piston head 12, which is connected to the rod 13, which slides in the cylinder 14, and carries on its lower end the piston head 15. This assembly forms a shock absorbing unit and tends to prevent rupturing of the cords or parachute when release is effected.

The compartment or chamber 8 is provided with a doorway 16, which is closed by the door 17, hinged at 18 to the body 5. This door is supplied with a pin 19, having an eye 19a to receive the end of the bolt 20, and this bolt slides in the guideway 21. The bolt is coupled to the lever 22 by means of the pin, which engages the slot 22a of the lever, and this lever is pivoted at 23, midway of its ends, and is provided with an arm 24 which is pivotally connected to the operating line 25, the forward end of which is pivotally connected to the lever 26, the lower end of which is pivoted at 27.

By operating the lever 26 the lever 22 will be rocked, thus withdrawing the bolt 20 from the eye of the pin 19. At the same time the link 28, which is also connected pivotally to the lever 26, and is pivotally connected to the valve 29, will release a compressed gas from the tank 30, to inflate the balloon 10, through the conduit 31, which connects the tank to the valve, and through the conduit 32, which connects the valve to the balloon.

The operating lever 26 is located near the pilot seat 33, so that it may be easily operated when a dangerous condition develops in flight. By pulling rearwardly on the upper end of the lever 26 the door will be released from the bolt 20, and at the same time pressure will be developed in the balloon, which will force the door to its open position when it is expanded sufficiently and expansion of the balloon will continue, until the parachute is opened, when the air will further inflate the parachute, so that it will be quickly expanded to extended safety supporting position.

It is not essential that the gas contained in the tank by buoyant, as it is the primary function of the gas to inflate the balloon, against the pressure of any vacuum which may form against the upper side of the body 5, which might tend to resist the inflation of the balloon. The pressure of the gas in the tank may be accordingly high enough to overcome any resistance or interference to inflation, and to insure that inflation will take place in the shortest possible period of time.

The door bolt is released at the same time that the pressure gas is released to inflate the balloon, so that no pressure will be developed by the inflation of the balloon against the holding door.

The pressure gas may be hydrogen, air, nitrogen, or illuminating gas. When a buoyant gas, such as hydrogen or illuminating gas is employed, the balloon tends to reduce the downward gravitational fall of the disabled aeroplane, by the force of any lifting action it may exert.

It will be seen, therefore, that my invention provides means for preventing aeroplanes from crash landing, and insures reasonable safety to the vehicle, its crew and all of the valuable equipment and supplies carried by the vehicle.

The balloon itself is connected to the body 5 by means of four restraining cords or cables 34, the connections being located outwardly of the compartment or chamber 8, and the door being so constructed as to close against these cords.

Having described my invention I claim as new:

In combination, an aeroplane having a fuselage provided with a door swinging upwardly and an opening closed by said door, a compartment carried by the fuselage and disposed directly under the opening and door, a vertical cylinder disposed under the compartment, a normally collapsed parachute and collapsed balloon disposed in the compartment, a compressed gas holder disposed adjacent to the compartment and provided with an outlet arranged to discharge into collapsed balloon, a valve controlling said discharge, said door having a keeper, a sliding bolt engaging said keeper to hold the door normally closed, a lever having angular end arms pivoted to said compartment to operate said bolt, a rod pivotally connecting said lever to said valve, a plunger sliding in said cylinder and connected with said parachute, and a manual lever pivotally supported in the fuselage and provided with a link pivotally connected thereto and to the first-named lever, whereby the door will be unlocked and the compressed gas supply will be released when said last-named lever is manually operated to cause the balloon to inflate and forcibly discharge and inflate the parachute, the parachute having cables anchoring the same to forward and rear parts of the fuselage.

JOHN WILLIAM BOWLES.

REFERENCES CITED

The following references are of record in the file of this patent:

UNITED STATES PATENTS

| Number | Name | Date |
|---|---|---|
| 1,011,683 | Webb | Dec. 12, 1911 |
| 1,569,391 | Pearl | Jan. 12, 1926 |
| 1,597,918 | Mangan | Aug. 31, 1926 |
| 1,823,758 | Owens | Sept. 15, 1931 |
| 1,836,319 | Gehrung | Dec. 15, 1931 |
| 1,423,611 | Hayes | July 25, 1922 |